US008565266B1

(12) United States Patent
Fox et al.

(10) Patent No.: US 8,565,266 B1
(45) Date of Patent: Oct. 22, 2013

(54) INTELLIGENT NODE FOR IMPROVING SIGNAL QUALITY IN A CABLE MODEM NETWORK

(75) Inventors: David Bryan Fox, Bolton, MA (US); Douglas Keith Rosich, North Reading, MA (US); Weidong Chen, Boxborough, MA (US); Jerry Guo, Windham, NH (US)

(73) Assignee: Casa Systems, Inc., Andover, MA (US)

( * ) Notice: Subject to any disclaimer, the term of this patent is extended or adjusted under 35 U.S.C. 154(b) by 0 days.

(21) Appl. No.: 13/526,284

(22) Filed: Jun. 18, 2012

Related U.S. Application Data

(63) Continuation-in-part of application No. 13/441,442, filed on Apr. 6, 2012.

(51) Int. Cl.
*H04J 3/18* (2006.01)
*H04J 3/16* (2006.01)
*H04N 7/173* (2006.01)

(52) U.S. Cl.
USPC ............................ 370/477; 370/468; 725/111

(58) Field of Classification Search
USPC ............ 370/468, 395.21, 485–487, 329, 337, 370/350, 347, 324; 725/82, 86, 95–97, 98, 725/103, 105, 111, 114, 116, 118, 129, 148, 725/149
See application file for complete search history.

(56) References Cited

U.S. PATENT DOCUMENTS

| 6,552,614 | B1 | 4/2003 | Stetson et al. |
| 7,068,712 | B1 | 6/2006 | Zang et al. |
| 7,085,287 | B1 * | 8/2006 | Chapman ...................... 370/468 |
| 7,672,332 | B1 * | 3/2010 | Chapman ...................... 370/468 |
| 8,214,871 | B2 * | 7/2012 | Shalvi et al. .................. 725/121 |
| 2002/0078464 | A1 | 6/2002 | Dravida et al. |
| 2003/0083054 | A1 | 5/2003 | Francesca et al. |
| 2004/0004032 | A1 | 1/2004 | Burger et al. |
| 2006/0126660 | A1 | 6/2006 | Denney et al. |
| 2008/0170853 | A1 | 7/2008 | Rakib et al. |
| 2010/0031305 | A1 | 2/2010 | Liva et al. |
| 2010/0142949 | A1 | 6/2010 | Mysore et al. |
| 2012/0275792 | A1 * | 11/2012 | Nandiraju et al. .............. 398/66 |

OTHER PUBLICATIONS

International Application No. PCT/US13/35562 Search Report and Written Opinion, Jun. 19, 2013, 15 pages.

* cited by examiner

*Primary Examiner* — Hanh N Nguyen
(74) *Attorney, Agent, or Firm* — Wilmer Cutler Pickering Hale and Dorr LLP

(57) ABSTRACT

Systems and methods are provided for improving the signal quality and performance in a cable operator's Hybrid Fiber Coax (HFC) plant by adding DOCSIS intelligence to components within the HFC plant. These intelligent DOCSIS devices, referred to here as DOCSIS Intelligent Nodes (DINs), intercept the upstream signal from cable modems and set top boxes, and perform various types of signal processing on the signals based upon knowledge of the signal characteristics obtained from CMTS control structures such as MAPs and Upstream Channel Descriptors (UCDs). The DIN functionality can be integrated into any type of device found in HFC networks such as RF amplifiers and fiber nodes.

25 Claims, 7 Drawing Sheets

A DOCSIS HFC Network.

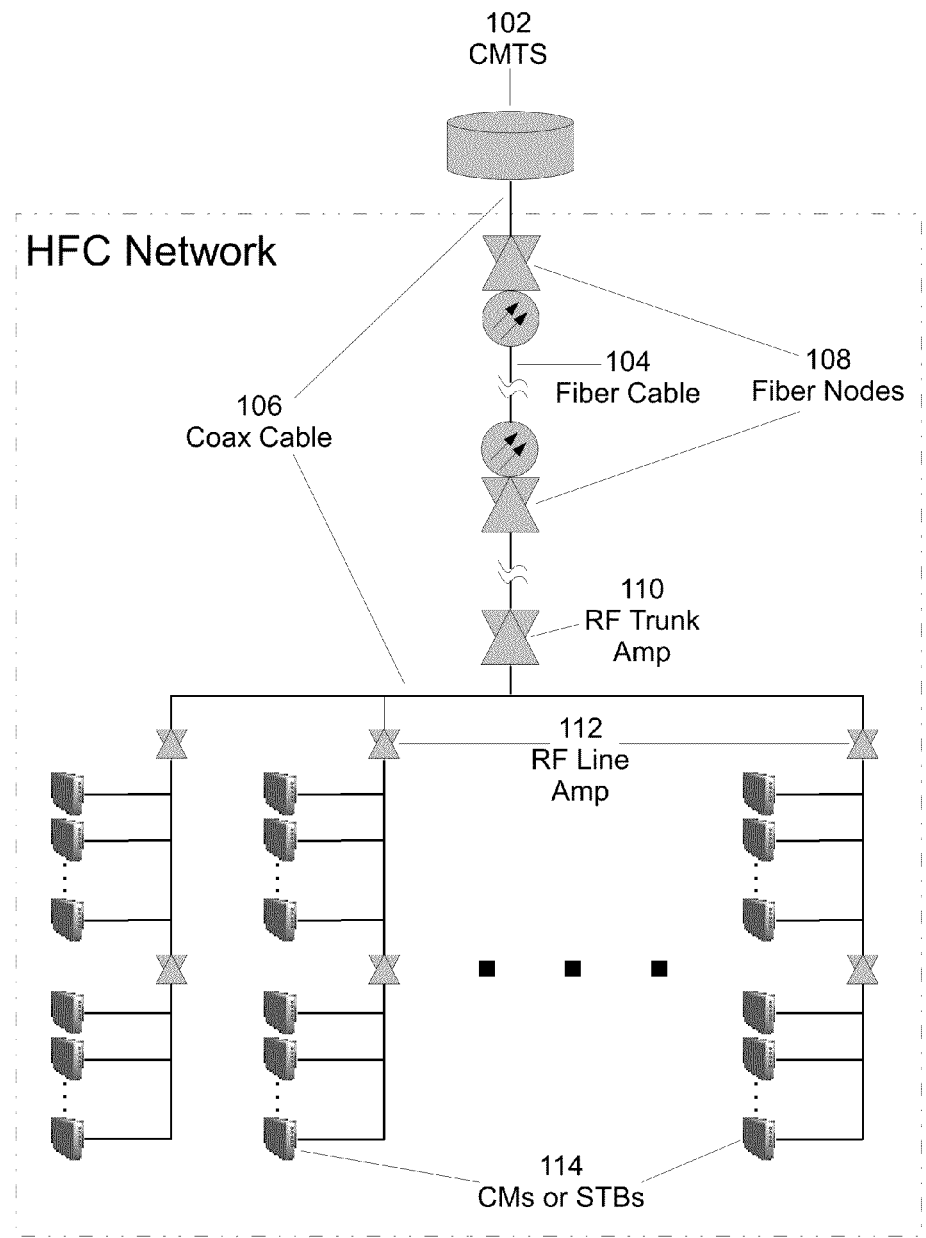
Figure 1: A DOCSIS HFC Network.

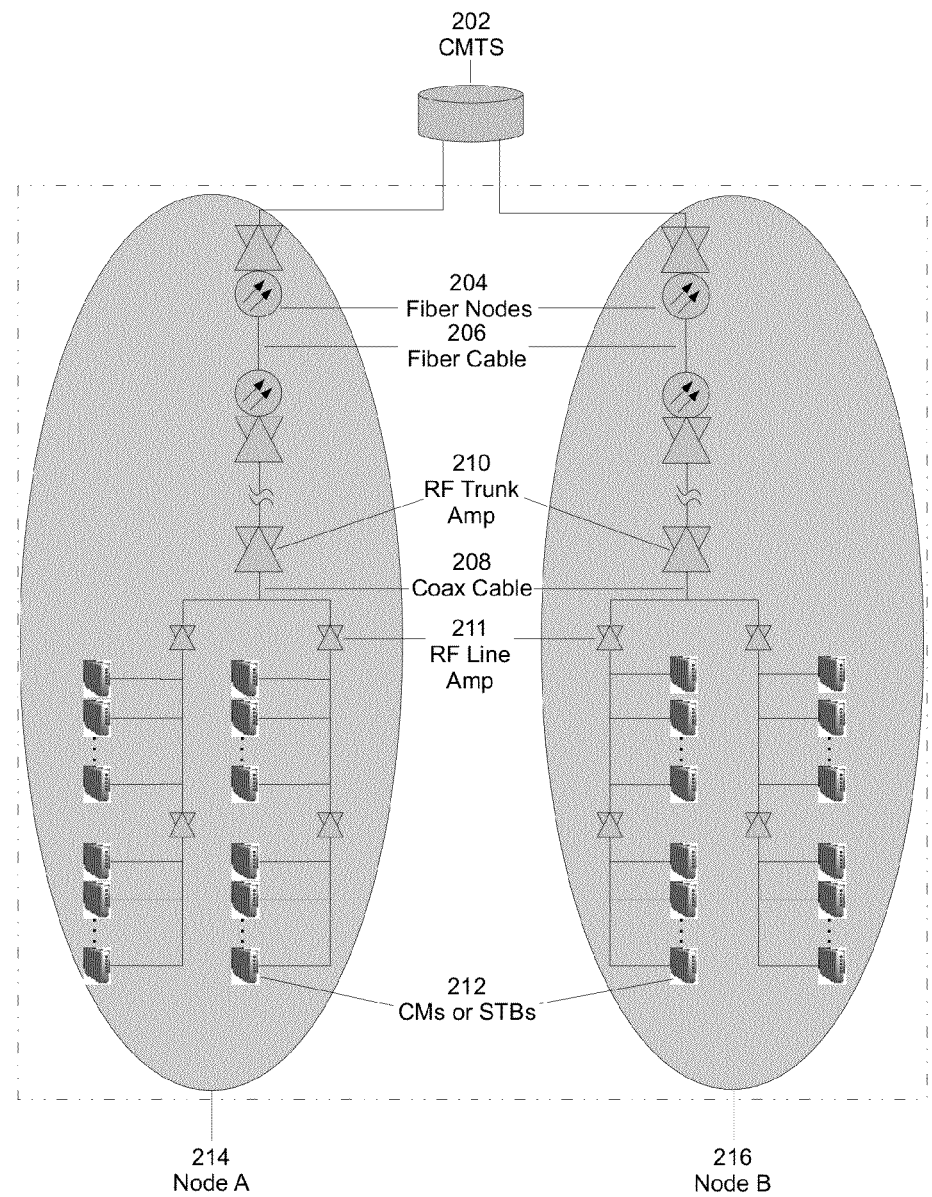
Figure 2: A node split HFC network.

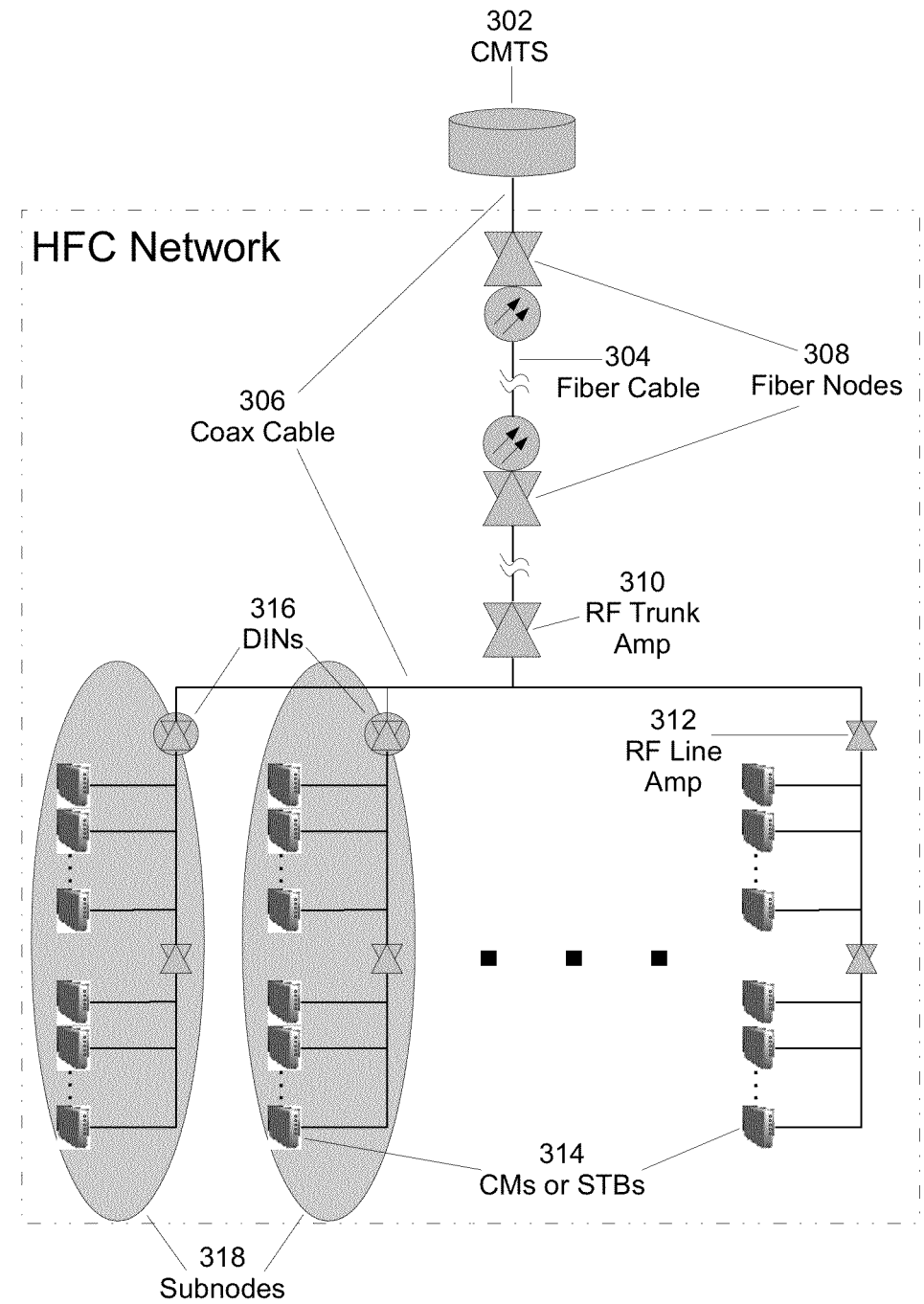
Figure 3: An HFC network with DINs.

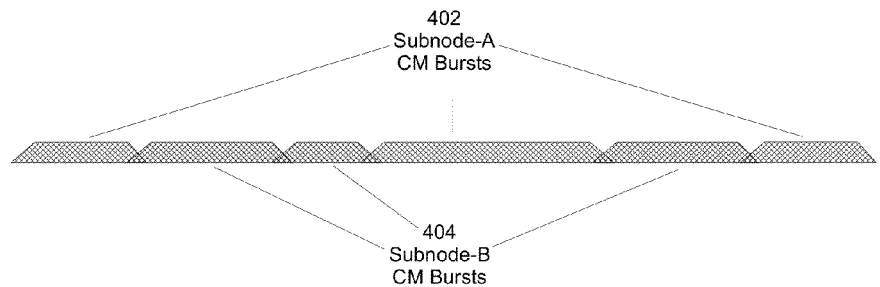
*Figure 4: Multi-Subnode burst timing.*
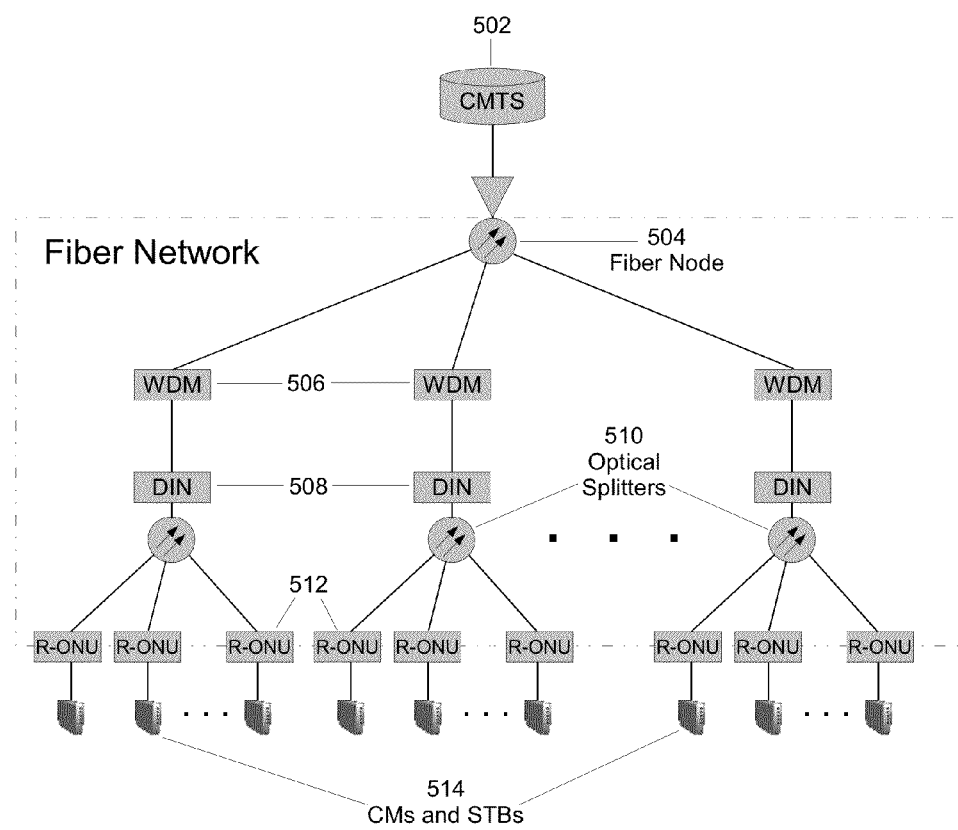
Figure 5: RFoG Network Diagram.

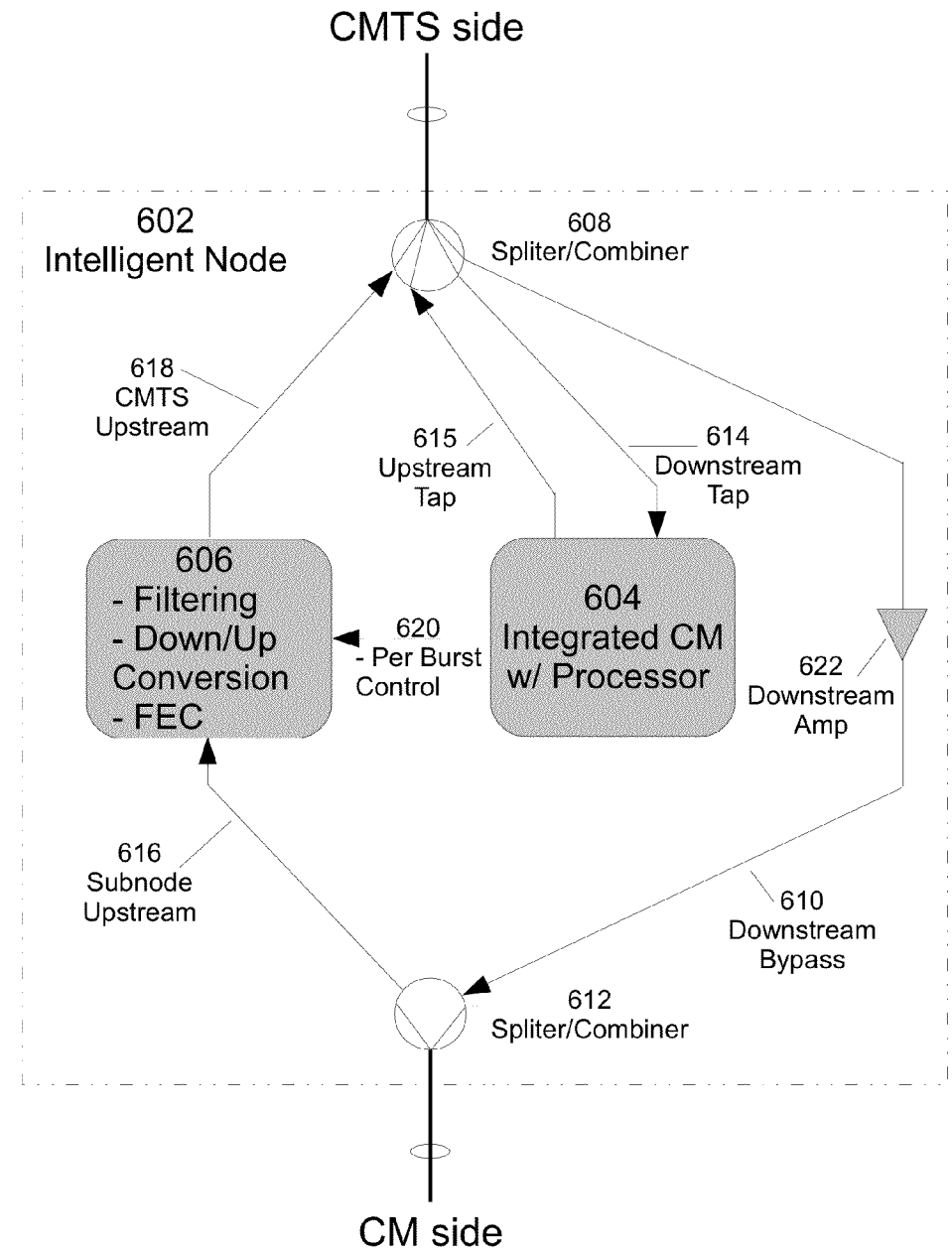
Figure 6: A Basic Intelligent Node.

INTELLIGENT NODE FOR IMPROVING SIGNAL QUALITY IN A CABLE MODEM NETWORK

CROSS REFERENCE TO RELATED APPLICATIONS

This application is a continuation-in-part of and claims priority under 35 U.S.C. §120 to U.S. patent application Ser. No. 13/441,442, filed on Apr. 6, 2012, entitled "INTELLIGENT NODE FOR IMPROVING SIGNAL QUALITY IN A CABLE MODEM NETWORK," the contents of which are incorporated herein in their entirety by reference.

FIELD OF DISCLOSURE

This disclosure relates generally to a system and method for improving the signal quality in a cable modem communication system by adding an intelligent node between cable modems and the cable modem termination system (CMTS).

BACKGROUND

Cable Modems (CMs), which can be found in both homes and businesses, communicate to a device which is known as a Cable Modem Termination System (CMTS). The signal between these devices traverses a network composed of both coaxial cable and fiber optic cable, known as a Hybrid Fiber-Coax (HFC) cable plant. The protocol used to communicate between the CMTS and CMs has been standardized by the CableLabs organization and is collectively known as DOCSIS (Data Over Cable Service Interface Specifications). The set of DOCSIS specifications defines the physical layer, media access control layer, and application interface layer.

Radio Frequency (RF) signals sent from the CM to the CMTS are subject to many different types of impairments as they traverse the HFC network. These impairments are typically caused by problems such as loose or corroded connections, unterminated lines, faulty equipment, and other noise caused by sources such as motors and lightning. Most of the impairments are seen in the upstream direction where many CMs can couple noise onto the upstream. In general, the more CMs attached to the same coaxial cable the more noise because the CMs share the uplink and the noise added by each CM link adds to the total noise on the uplink.

As the noisy RF signal traverses the HFC plant, it will be re-amplified by devices such as RF amplifiers and Fiber Nodes, but none of these devices will clean up the quality of the signal.

SUMMARY

Systems and method are provided for improving the signal quality and performance in a cable operator's HFC plant by adding DOCSIS intelligence to components within the HFC plant. Intelligent DOCSIS devices intercept the upstream signal from cable modems and set top boxes, and perform various types of signal processing on the signals based upon knowledge of the signal characteristics obtained from CMTS control structures such as MAPs and Upstream Channel Descriptors (UCDs). The intelligent DOCSIS device functionality can be integrated into any type of device found in HFC networks such as RF amplifiers and fiber nodes.

In some embodiments a method of intelligently collecting and using DOCSIS control information in a cable modem communication network by an intelligent node to improve upstream signal transmissions on the network, said intelligent node being in communication with a cable modem termination system (CMTS), cable modems (CMs), and other devices is provided. This method includes the intelligent node obtaining CM identifier information for CMs and other devices on said network, the intelligent node obtaining control information from said cable modem communication network, including at least one of a DOCSIS MAP or a DOCSIS UCD control structure; the intelligent node synchronizing to a DOCSIS timestamp clock maintained by said cable modem communication network, the intelligent node using said obtained control information and said CM identifier information to determine when a device is scheduled to transmits on an upstream communication link, the intelligent node using the obtained control information to modify transmissions on the upstream communication link, and the intelligent node receiving upstream traffic from a sub-node, compressing the received data from the sub-node, and re-transmitting the compressed data to the CMTS so as to reduce the bandwidth requirements on the section of the HFC network upstream of the sub-node.

BRIEF DESCRIPTION OF THE DRAWINGS

FIG. 1 illustrates a Hybrid Fiber-Coax (HFC) cable plant network in accordance with certain embodiments;

FIG. 2 illustrates a split node Hybrid Fiber-Coax (HFC) cable plant network in accordance with certain embodiments;

FIG. 3 illustrates a Hybrid Fiber-Coax (HFC) cable plant network including DOCSIS intelligent nodes (DINs) in accordance with certain embodiments;

FIG. 4 illustrates multi-subnode burst timing among cable modems in accordance with certain embodiments;

FIG. 5 illustrates an example of an RF over Glass (RFoG) cable network in accordance with certain embodiments; and FIG. 6 illustrates a simplified block diagram of a DOCSIS intelligent node (DIN) in accordance with certain embodiments.

DETAILED DESCRIPTION OF INVENTION

Figure 7:
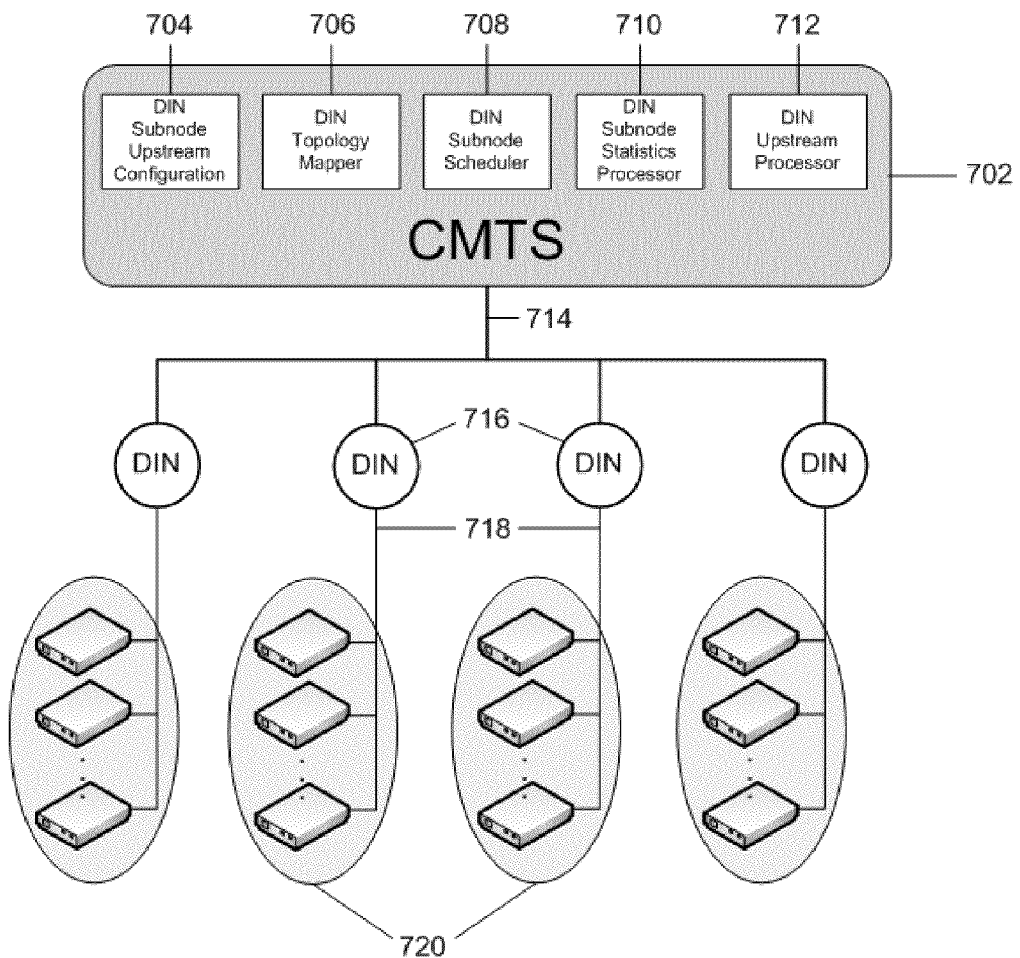
FIG. 7 illustrates a simplified block diagram of how the CMTS relates to the operation of the DOCSIS intelligent node in accordance with certain embodiments.

This disclosure relates generally to a system and method for improving the signal quality in a cable modem communication system by adding DOCSIS intelligence to the devices within the HFC plant which connect cable modems to a Cable Modem Termination System (CMTS). Currently, devices within the HFC network, such as RF amplifiers and Fiber Nodes, possess no specific knowledge about the type of RF transmission occurring on the wire. By adding DOCSIS intelligence and awareness to the HFC network, an intelligent device can perform signal processing on the upstream signal in order to clean up the quality of the signal before re-transmission to the CMTS. For example, the intelligent device may filter out of band noise, or it may completely demodulate the data burst, perform FEC data correction, and remodulate the signal. These devices will herein be referred to as DOCSIS Intelligent Nodes (DINs).

The DINs can obtain information about the cable modem's upstream RF transmission by detecting or snooping certain control information sent from the CMTS to cable modems as well as obtaining control information directly from the CMTS. The control information communicated from the CMTS to CMs can include DOCSIS MAP and UCD control structures. DOCSIS MAPs, as known in the art, specify, among other things, the time slots during which different CMs may send data; UCD control structures, among other things, specify the characteristics of the upstream such as the symbol rate, type of modulation, and type of FEC to be used. In some embodiments, the CMTS will require modifications in order to communicate with the DIN for the purpose of controlling the actions of the DIN and retrieving status information from the DIN.

With knowledge about the type of RF transmission, the DIN can perform a number of operations on the received signal including: cleaning up the signal by removing out-of-band noise; de-modulating and re-modulating the received signal to remove in-band noise; calculating equalization coefficients; and performing frequency shifting operations on the received channel to name a few. Frequency shifting allows for more efficient usage of the spectrum by using the lower portion of the spectrum below 15 MHz which would otherwise be riddled with ingress burst noise if CMs located in the household environment were to transmit on frequencies below 15 MHz.

FIG. 1 shows a typical HFC plant which includes: the CMTS 102, Fiber Cable 104, Coaxial Cable 106, Fiber Nodes 108, RF Trunk Amplifiers 110, RF Line Amplifiers 112, and CMs and set top boxes (STBs) 114. The CMTS 102 sends data traffic and control traffic over the HFC network to the CMs and/or STBs 114. The HFC network allows for bi-directional communication between the CMTS and the CMs. The CMTS attaches to the HFC network via coaxial cable. The signals being sent over the coaxial cables are then translated to fiber optic signals and then back to coax cable by fiber nodes 108. The translation to fiber is performed in order to allow for greater distances between the CMTS and the CMs.

The DINs can be placed virtually anywhere in the HFC network. In FIG. 3 two of the RF line amplifiers from FIG. 1, 112, were replaced with two DINs in FIG. 3, 316. Alternately, any number of the RF line amplifiers can easily be replaced by DINs in order to isolate the noise coming from the CM side of the RF line amplifier. For the purposes of this discussion, a DIN subnode is defined as the portion of the HFC plant downstream (i.e., on the CM side) of the DIN. For example, FIG. 3 shows two DIN subnodes, 318.

One common practice to improve the upstream quality in the plant is called "node splitting". A node is essentially defined by the CMs which share the same coaxial connection back to the CMTS. FIG. 1 represents what a single node might look like. FIG. 2 shows an example of what might be done if the single node shown in FIG. 1 is split into two nodes. FIG. 2 shows: a CMTS 202, Fiber Nodes 204, Fiber Cable 206, Coaxial Cable 208, RF Trunk Amplifiers 210, RF Line Amplifiers 211, Cable Modems 212, and two separate nodes 214 and 216. In this example, an additional RF trunk amplifier, 210, two fiber nodes, 204, and an additional upstream connection to the CMTS, 202, were added in order to split the node. Therefore, node splitting can add considerable expense to the HFC plant.

Node splitting helps improve the quality of the upstream signal because there are fewer CMs attached to a single node. Therefore, the total noise contribution from the CMs is less. The upstream signal quality is also improved by the fact that there are fewer RF line amplifiers and fewer feet of coaxial cable.

FIG. 3 shows an alternative to the node splitting solution shown in FIG. 2 by using DINs, 316. FIG. 3 shows a CMTS 302, Fiber Cable 304, Coaxial Cable 306, Fiber Nodes 308, an RF trunk amplifier 310, an RF line amplifier 312, Cable Modems 314, DINs 316, and subnodes 318. Instead of splitting the node, two of the RF line amplifiers shown in FIG. 1, 112, have been replaced by DINs. The DINs will process signals from each of the subnodes, 318, in a similar manner that the CMTS processes the upstream signals. The DIN can de-modulate the signal, perform FEC error correction, and then re-modulate the signal for example. In doing so, the DINs isolate the noise that originates from the subnodes, 318, such that the CMs belonging to the subnodes do not contribute to the total noise of the node. Also, since the DINs are closer to the CMs, and only receive signals from a portion of the CMs in the node, the subnodes will not be as noisy, thus allowing for higher data rate operation. When the DIN re-transmits the signal on the upstream, only the noise contribution from the DIN itself is coupled onto the upstream. When compared to the node-splitting alternative, the DIN solution saves money by reducing the number of fiber nodes and the number of fibers required in the HFC network.

The DIN works by cleaning up the quality of the signal on its corresponding subnodes by using methods known in the industry to combat the most common types of impairments found in HFC networks. These impairments are typically caused by problems such as loose or corroded connections, unterminated lines, faulty equipment, and other noise caused by sources such as motors and lightning. Most of the impairments are seen in the upstream direction where many CMs can couple noise onto the upstream. In general, the more CMs attached to the same coaxial cable the more noise. The coaxial network in a household is not managed by the cable companies. Therefore, loose coaxial connections, poor grounding, inferior equipment, and unterminated lines all contribute to the noise coupled into the upstream. Household appliances with motors as well as other noisy household devices such as dimmers can also contribute to the noise on the upstream portion of the cable plant.

Even within the same upstream channel, the quality of the signal between different CMs and the CMTS can vary depending upon the location of the CM in the network topology. For example, FIG. 1 shows multiple RF line amplifiers 112. In this figure, some CMs are two RF amplifiers away from the CMTS, and some are only one. Each RF amplifier can introduce some amount of non-linearity to the signal. Therefore, you can expect the signal to be a little bit worse for those CMs which are 2 RF amplifiers away from the CMTS.

The DOCSIS specification has developed a number of tools to combat the common impairments seen in the upstream. These impairments include Additive White Gaussian Noise (AWGN), burst/impulse noise, ingress noise, common path distortion, group delay, impedance mismatches and amplifier non-linearity. Some of the tools for dealing with these impairments include Reed Solomon (R-S) coding, interleaving, and pre-equalization. In addition, proprietary methods have been employed to clean up the cable plant, such as ingress noise cancellation. However, these measures can only help up to a certain point. Ultimately, a clean cable plant is required to achieve the maximum possible performance from the HFC network. The DIN can greatly enhance the quality of the plant by cleaning up the signal as it traverses the RF network.

One function of the DIN is to isolate upstream noise on its subnode (the CM side of the DIN) from the rest of the HFC network. In order to accomplish this, the DIN uses knowledge about when a CM belonging to its subnode is transmitting. This allows the DIN to electrically isolate one or more non-transmitting subnodes from the rest of the node while other CMs are transmitting, and removes any noise contribution from those subnodes. The DIN determines when a CM is transmitting by monitoring the MAPs which are sent from the CMTS to the CM. The MAPs instruct a CM when it is allowed to send its burst of data. FIG. 4 illustrates an example where CMs from two different subnodes, 402 and 404, are transmitting. During its allocated time slot, as determined from the MAP, the CM will ramp-up its power, send its data, and then ramp back down. As shown in FIG. 4, the ramp-up and ramp-down times may overlap between different transmissions, but only a single CM in the node is allowed to send data on a given channel.

Since the DIN has access to the same MAP information, it will only transmit when one of the CMs from its subnode is scheduled to transmit. Maintaining a list of all CMs in its subnode could be cumbersome for the DIN, but this task can be simplified by assigning DOCSIS Service Identifiers (SIDs) such that all SIDs belonging to the same subnode have a common characteristic. This common characteristic could be a range of SIDs for example, or a portion of the SID can be set to the same value for all CMs in the subnode. The DOCSIS Service Identifier uniquely identifies traffic flows from a given CM. Since the CMTS allocates the values of the SIDs, it can perform the required association for each DIN subnode.

Another useful feature of the DIN is to identify the network topology to help isolate problems within the cable network. The DIN can aid in defining the network topology by tagging upstream packets with a unique DIN identifier which lets the CMTS know that the upstream packet came from a device located within the DIN's subnode. While this identifier can be added to any number of packets, one option is to add this identifier to initial-ranging packets. The CMTS can then assign a SID to the CM which is associated with the DIN's subnode, thereby obviating the need for the DIN to imbed its identifier in future packets.

FIG. 5 shows an example of an RF over Glass (RFoG) cable network which consists of the CMTS 502, a Fiber Node 504, Wave Division Multiplexing Devices 506, DINs 508, Optical Splitters 510, RFoG Optical Network Units (R-ONU) 512, and Cable Modems 514. The RFoG network is mostly made up of fiber optic cables. Coaxial cable may only be used to attach the CMTS and the CMs to the network. The fiber connection from the R-ONU is optically combined at 510 with the output of other R-ONUs in the network. To avoid interfering with other R-ONUs, the R-ONUs are designed to only transmit when a CM on the coaxial side of the R-ONU is transmitting. In existing art, this is done by monitoring the input energy on the R-ONU side, and only transmitting when the energy reaches a certain threshold. Since the R-ONU only switches on its laser when energy is detected, the RFoG structure has the added benefit of isolating any noise from the CM side of the R-ONU from the rest of the fiber network.

However, the benefits provided by this type of isolation are limited. Energy in the form of noise can cause the laser of the R-ONU to falsely switch on. Also, CMs behind one R-ONU can be transmitting at the same time as CMs behind a different R-ONU by using different frequencies. In this scenario, the noise contributions from the CM or CMs behind the R-ONUs are combined. In addition, Passive Optical Networks (PONs), such as the RFoG network shown in FIG. 5, can suffer from an additional impairment known as Optical Beat Interference (OBI) when sub carrier frequencies on the same wavelength are combined. While these affects can be somewhat mitigated by attempting to schedule the CMs such that only CMs behind the same R-ONU can transmit on different frequencies at the same time, this situation is far from ideal since the scheduling can significantly limit the flexibility in the system. Unlike the R-ONU, which uses input energy to determine when to transmit, the DIN uses MAP information. Therefore, the DIN will not falsely turn on due to noise on the CM side. This is an improvement over the current functionality of the R-ONU. Knowing when to transmit is only one of the potential functions of the DIN. Other features may be added to the DIN with associated cost/performance trade-offs as will be shown in the text that follows.

As discussed, in its simplest embodiment the DIN can be an RF switch that turns on and off based on MAP information from the CMTS. When the RF switch is on, all frequencies on the CM side of the DIN pass through to the rest of the node. Therefore, the noise contributions from the DIN subnode will impact the rest of the node. This can be mitigated by filtering out all frequencies except for those used by the CMs in the DIN's subnode during any given burst. Therefore, the DIN can use knowledge of the center frequency and channel width of the channels being used by the CMs in the subnode to setup the filtering. The center frequency and channel width information is provided in the DOCSIS Upstream Channel Descriptors (UCDs) which are sent from the CMTS to the CMs. Either by snooping control messages, or via control messages from the CMTS to the DIN, the DIN can form an association between a group of SIDs and a particular upstream, thereby obtaining the frequency characteristics of each data burst by using the SID information in the MAPs. The DIN can filter out any out-of-band noise using a variety of techniques. For example, the DIN can mix down the frequency of the channel to baseband, filter out higher frequencies, and then re-mix back up to the desired frequency to filter out any out-of-band noise. Note that since the DIN would be expected to handle all upstream frequencies in the node, mixers would be needed for the defined frequencies, typically 4 to 8.

Another benefit of mixing the frequency down and back up again in the DIN is that the carrier frequency of the channel may be relocated. This is especially beneficial when dealing with frequencies below 15 MHz. A number of noise sources typically found in households can create an excessive amount of noise on frequencies less than 15 MHz. Common frequencies found in the household will couple into the upstream making the noise so extreme that this portion of the spectrum is unusable. However, the DIN can re-claim this portion of the spectrum by receiving channels on carriers above 15 MHz and re-locating them onto carriers below 15 MHz. The DIN itself will not couple a significant amount of noise onto the channels under 15 MHz, thereby making it possible to re-claim this bandwidth. While the total number of available channels for a given subnode may not change, moving the traffic from the subnode to a previously unused portion of the spectrum frees up bandwidth for CMs on other subnodes.

The carrier frequency relocation function can also be useful for moving the carrier frequency of a CM channel to a higher frequency which is not supported by the CM. In this manner, the limited upstream frequency range of the CM can be expanded into a wider frequency range, thereby providing additional bandwidth to the node. For example, the US DOCSIS 2.0 standard limits the upstream frequency range to a maximum of 42 MHz. The DIN can relocate channels below 42 MHz to channels above 42 MHz for some of the CMs in the node. The CMs which are relocated to new channels no longer need to share the bandwidth with CMs which are still using the channels which are less than 42 MHz.

While isolating subnodes within the node will greatly reduce the amount of noise coupled into the plant, when a DIN is transmitting, the signal from the CM in its subnode still needs to traverse the remainder of the HFC plant which is on the CMTS side of the DIN. Therefore, the signal can experience additional degradation due to impairments in the portion of the plant upstream of the DIN. The DIN can improve this situation by performing additional signal processing on the RF signal from the CM before forwarding it upstream to the CMTS. One such signal processing function is pre-equalization.

Existing RF amplifiers can provide some amount of equalization by allowing a fixed "tilt correction" to be configured. "Tilt" is a phenomenon which is due to the frequency response of the plant. For example, higher frequencies will be attenuated more than lower frequencies. Therefore, when you look at the amplitude of a signal over a frequency range, instead of a nice flat line, you will see a tilt. The tilt correction provided by RF amplifiers in the current art only provides a fixed correction which doesn't perfectly match the actual frequency response of the plant. Also, different CMs will have different frequency response characteristics depending upon where they're located in the plant. DOCSIS defines a method for the upstream receiver in the CMTS to provide pre-equalization by having the upstream receiver measure the frequency response of the system and then provide pre-equalization coefficients to the CM to compensate for the frequency response of the plant. While the pre-equalization provided by the CMTS can correct for some amount of tilt, it can not necessarily correct for the additive tilt which might be seen after passing through a number of cascaded RF amplifiers.

Instead of programming a fixed amount of tilt correction into an RF amplifier, a DIN may be used to automatically calculate the amount of pre-equalization required. This can be done down to the granularity of a single CM using the already defined DOCSIS mechanisms, thereby improving on the tilt correction provided by current RF amplifiers. Currently, during DOCSIS periodic ranging bursts, the CMTS will calculate pre-equalization coefficients which are then sent down to the CM to be used in its pre-equalizer. This calculation is performed uniquely for every CM. Since the DIN has knowledge of when the periodic ranging bursts occur, the DIN can calculate pre-equalization coefficients during the periodic ranging bursts and then forward the information to the CMTS. These coefficients can then be sent to the CM such that the CM can compensate for the frequency response of the DIN subnode. Independently, the CMTS, treating the DIN like another CM, can schedule periodic ranging bursts for the DIN and calculate pre-equalization coefficients that the DIN should use when forwarding bursts on its upstream link to the CMTS. By performing pre-equalization in segments like this, the pre-equalization can better handle severe frequency distortion in the HFC plant since each equalizer by itself has limited correction capability.

Another tool used in the DOCSIS upstream to help mitigate both Additive White Gaussian Noise (AWGN), as well as burst/impulse noise, is Reed Solomon Forward Error Correction (R-S FEC). Reed Solomon codes provide redundant parity bytes which can be used to correct for data bytes which were corrupted due to impairments on the HFC network. R-S codes divide the data up into codewords. A codeword has a fixed number of data bytes and a fixed number of parity bytes. The number of data bytes that can be corrupted depends upon the number of parity bytes selected. Both the length of the codeword and the number of parity bytes are configurable in DOCSIS. The DIN can be used to de-modulate the received burst, perform R-S FEC correction on the data, and then re-calculate the FEC before forwarding the burst upstream to the CMTS. Doing so makes the FEC more effective since the codewords sent from the CM only need to correct for any noise seen on the DIN subnode. Upstream from the DIN, the FEC is re-calculated such that the FEC only needs to correct for noise introduced in the upstream portion of the plant. By effectively making the FEC stronger, the HFC plant can run at higher data rates and/or support additional CMs on the node. Since R-S FEC encoding is often used in conjunction with interleaving, the DIN also needs to be able to de-interleave the data.

Unlike a standard RF amplifier, the DIN has the ability to dynamically vary the amount of amplification provided on a burst-by-burst basis. This is useful in situations where highly attenuated CM or Set Top Boxes (STBs) are present. Within the household, each splitter that the coaxial cable passes through adds some amount of attenuation to the signal. Therefore, depending upon the wiring in the household, some devices may have a significant amount of additional attenuation. While CMs/STBs can vary their output power, extensive attenuation may cause these devices to hit their power limits. When this happens, the signal arriving at the CMTS may not be strong enough to establish a link with the CMTS, and/or the CM/STB might experience degraded performance due to a lower SNR. The DIN can boost the power of the bursts from the highly attenuated CMs/STBs such that the signal can reach the CMTS at the same power level as other CMs/STBs. The power boost also allows the highly attenuated device to maintain a better SNR through the rest of the network upstream of the DIN.

In addition to improving the signal quality of an upstream channel, the DIN may also be used to completely modify the upstream channel characteristics. The upstream channels on the subnode (i.e. CM) side of the DIN and on the CMTS side of the DIN may be independently defined. For example, 4 lower speed upstream channels may be configured on the subnode side of the DIN, and 2 higher speed upstream channels may be configured on the CMTS side of the DIN. In yet another embodiment, the upstream channels on the subnode side of the DIN could be configured as non-bonded channels, while the upstream channels on the CMTS side of the DIN are configured as bonded channels. When the upstream channel definitions are different for the subnode and CMTS sides of the DIN, an entity in the network needs to independently schedule the upstream channels belonging to the subnode, and the upstream channels which are attached directly to the CMTS. The scheduler for the subnode side of the DIN could be located in the DIN or in the CMTS.

Since the DIN has the ability to independently define the channels located on its subnode side and the channels located on its CMTS side, the DIN may be used to migrate to new technology which is not supported by the CMs. For example, the DOCSIS 3.0 specification defines the maximum QAM modulation for TDMA bursts to be 64 QAM. Therefore, the DIN is restricted to use 64 QAM or lower modulation orders when communicating with DOCSIS 3.0 devices. However, the DIN is free to use higher modulation orders, such as 128 QAM or 256 QAM when communicating with the CMTS as long as the CMTS supports it.

As previously mentioned, the DIN can be placed anywhere in the network, and can replace devices currently found in the HFC plant such as RF amplifiers, fiber nodes, and R-ONUs. Depending upon the placement of DINS in the network, the DIN can also provide valuable HFC network statistics to help the operator identify and debug problem areas of the network. The DIN can bring integrated network monitoring capability into existing components such as RF amplifiers and fiber nodes. This new capability is made possible by the DOCSIS intelligence that has been added to the node. Every DIN creates a subnode downstream of the DIN. The DIN has the ability to monitor a variety of characteristics of the subnode such as the SNR, power levels, burst noise, uncorrectable error rates, correctable error rates, and ingress tones to name a few. By gathering this type of information for each subnode, the source of impairments on the network can be better isolated.

In addition to monitoring the condition of the subnode, the DIN can also assist the CMTS in measuring characteristics of the portion of the network between the DIN and the CMTS. For example, the DIN can send signals at calibrated power levels both in-band and out-of-band in order to assist the CMTS in determining the attenuation, frequency response and noise characteristics of the plant.

FIG. 6 shows a simplified block diagram of the DIN, 602. The DIN consists of two primary functions, the integrated CM function, 604, and the upstream signal processor, 606. Other parts of the DIN include: an upstream splitter/combiner 608, a downstream bypass path 610, a downstream splitter/combiner 612, a downstream tap 614, an upstream tap 615, the subnode upstream interface before signal processing 616, the CMTS upstream interface after signal processing 618, the per-burst control path 620, and the downstream amplifier 622. The integrated CM function, 604, taps into the downstream, 614, and upstream, 615, RF and is used to manage the control plane of the DIN. The CM function appears as just another CM to the CMTS. Some of the information that the DIN uses, such as MAPs and UCDs, is used by all CMs on the subnode, and can be snooped by the CM function. Other DIN unique control traffic may be unicast to/from the CMTS.

The DIN provides the necessary per-data-burst control information to the upstream signal processor, 606. This information includes the timing of the burst, the length of the burst, the channel number, and burst profile information (i.e. QAM modulation order, R-S FEC encoding, interleaving parameters, etc.). The upstream signal processor is configured to perform a variety of upstream signal processing functions on the subnode's upstream signal, 616. This could include up/down conversion of the center frequency, noise filtering, de-modulation and re-modulation, power normalization, de-interleaving, and FEC error correction. The upstream signal processor will also measure various statistics of the received burst such as received power level, SNR, burst noise characteristics, and correctable/uncorrectable error counts. This information is gathered by the integrated CM where it's made available for queries by the CMTS.

The integrated CM, 604, may also perform various functions at the request of the CMTS. For example, a Fast Fourier Transform (FFT) of the upstream interface may be performed at the request of the CMTS. The upstream signal processor, directed by the integrated CM, may also generate various upstream test signals for the CMTS in order to measure the characteristics of the upstream portion of the HFC plant.

Since the downstream portion of the HFC plant is relatively clean, in some embodiments no processing is performed. As shown in FIG. 6, the downstream signal is amplified at 622, but there's no additional processing done. Unlike a traditional RF amplifier which has a fixed amount of amplification, the CMTS can communicate with the integrated CM function, 604, to change the amount of amplification in the downstream direction.

The DIN can be designed with many variations, but the basic functionality remains the same. The DIN's external interfaces to the CM and CMTS may be copper or fiber depending upon where in the network the DIN is designed to be placed. For example, if the DIN is designed to replace one of the R-ONU units, 512, shown in FIG. 5, then the CM connection would be copper and the CMTS connection would be fiber.

The amount of signal processing performed by the upstream signal processor, 606, in FIG. 6 can also vary depending upon cost/functionality tradeoffs. For example, using the previous example of replacing an R-ONU, the DIN might only need to know when to switch the fiber interface on and off. In this case, the timing information in the MAPs is used to control the switching of the fiber interface, but no additional processing is performed on the RF signal from the CM. This would be an example of a DIN with only basic functionality.

Some embodiments of this invention require new functionality to be implemented on the CMTS. FIG. 7 shows how the CMTS relates to the operation of the DOCSIS intelligent node. The CMTS, 702, contains a number of processing blocks including: a DIN subnode upstream configuration unit, 704; a DIN topology mapper, 706; a DIN subnode scheduler, 708; a DIN subnode statistics processor, 710; and a DIN upstream processor, 712. The CMTS is responsible for configuration and operation of the DIN network which includes: the DIN upstream connection, 714; the DIN themselves, 716; the DIN subnode networks, 718; and the overall DIN subnodes, 720. In some embodiments, the configuration of the upstream channels defined in the DIN subnode networks, 718 is different than the configuration of the upstream channels defined for the DIN upstream connection, 714. In these cases, the DIN subnode upstream configurator, 704, must provide configuration utility not only for upstreams connected directly to the CMTS, 702, but for remote upstreams, which are connected to the DINs, 716. In these cases, the DIN upstream channels, 714, and the DIN subnode upstream channels, must also be separately scheduled by the CMTS. This is done by the DIN subnode scheduler, 708. Note that the DIN subnode scheduling function may be performed by the DINs themselves in some embodiments.

Knowing which CMs/STBs belong to which DIN subnode is a very useful function for both the DIN, 716, which benefits from a simple means of identifying CMs/STBs belonging to the DIN subnode, 720, as well as for the end user for the purposes of isolating impairments in the network. The DIN topology mapper, 706, in the CMTS gathers information provided by the DIN in order to identify the devices within each DIN subnode. The topology mapper, 706, works in conjunction with the DIN subnode statistics processor, 710, in order to maintain RF health statistics for each individual DIN subnode, 720. This allows for improved isolation of problems within the network.

As previously discussed, the DIN, 716, can act as a translator, converting DOCSIS standard upstream channels used in the DIN subnode, 718, to non-DOCSIS standard upstream channels which may be used in the DIN upstream channels, 714. For example, the QAM modulation order, carrier frequency, or even modulation method may be different for the DIN upstream channels, 714. These non-standard functions require new processing within the CMTS. This processing block is represented by the DIN upstream processor, 712, in FIG. 7.

In summary, the DOCSIS integrated node adds a whole new dimension to the HFC network by adding DOCSIS intelligence and digital signal processing functions to the common building blocks found in HFC networks such as RF amplifiers and fiber nodes. The DIN can significantly clean up the RF signals in the upstream direction, thereby allowing for greater data rates and larger numbers of CMs on a node. The DIN can also provide valuable monitoring functions throughout the HFC network to allow operators to better isolate problems in the HFC network. Since the DIN replaces components which are already required in the HFC network, the additional functionality provided by the DIN can be added at a nominal additional cost.

Figure 8:
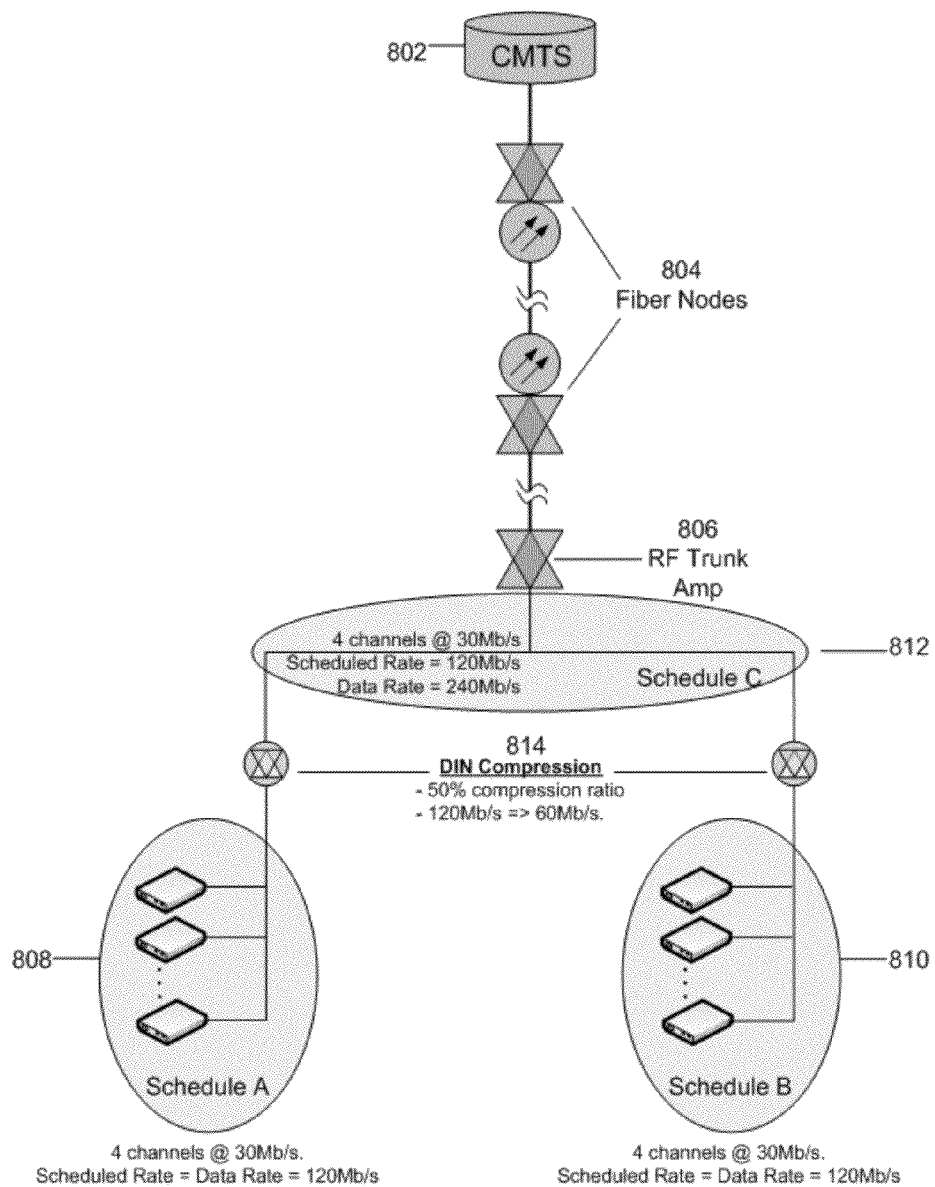
FIG. 8 illustrates a simplified block diagram of how the intelligent node performs data compression on the upstream data as it passes through the node.

In another embodiment, the intelligent node performs data compression on the upstream data as it passes through the node so as to improve the bandwidth efficiency on the portion of the node upstream of the intelligent node. FIG. 8 shows a node consisting of two subnodes, 808 and 810, connected to the common portion of the node, 812, through intelligent node devices 814. Both subnodes are configured to operate on the same 4 channels. Each channel has a data rate of 30 Mb/s, such that the total data rate available at any point in the node is 120 Mb/s. In existing DOCSIS implementations, where no data compression scheme is defined in the upstream, both subnodes must be scheduled together and both subnodes share the 120 Mb/s bandwidth. For example, the intelligent nodes, 814, are assumed to achieve a compression ratio of 50%. With such a compression ratio, the 120 Mb/s of bandwidth on subnodes 808 and 810 are each effectively reduced to 60 Mb/s. Since the common portion of the network, 812, can support 120 Mb/s, both subnodes may utilize 120 Mb/s of bandwidth without sharing with the other subnode. Therefore, the effective bandwidth on the common portion of the subnode is 240 Mb/s.

In order to make such a scheme work, each subnode, 808 and 810, must be individually scheduled by the CMTS, 802. In addition, since the intelligent nodes, 814, change the size and bandwidth characteristics of the data traffic, both intelligent nodes must be scheduled together and compete for the bandwidth on the common portion of the node, 812. The compressed data is sent from the intelligent node to the CMTS where it is decompressed. Since DOCSIS does not define a data compression standard, any number of data compression schemes may be employed by the intelligent node and the CMTS. Since the compression is performed by the intelligent node, standard off-the-shelf cable modems may be used.

What is claimed is:

1. A method of intelligently collecting and using DOCSIS control information in a cable modem communication network by an intelligent node to improve upstream signal transmissions on the network, said intelligent node being in communication with a cable modem termination system (CMTS), cable modems (CMs), and other devices, the method comprising:
   the intelligent node obtaining CM identifier information for CMs and other devices on said network;
   the intelligent node obtaining control information from said cable modem communication network, including at least one of a DOCSIS MAP or a DOCSIS UCD control structure;
   the intelligent node synchronizing to a DOCSIS timestamp clock maintained by said cable modem communication network;
   the intelligent node using said obtained control information and said CM identifier information to determine when a device is scheduled to transmits on an upstream communication link;
   the intelligent node using the obtained control information to modify transmissions on the upstream communication link; and
   the intelligent node receiving upstream data traffic from a sub-node, demodulating the received upstream data traffic from the sub-node, compressing the demodulated received upstream data traffic from the sub-node, re-modulating the compressed demodulated received upstream data traffic data, and re-transmitting the compressed data to the CMTS so as to reduce the bandwidth requirements on the section of an HFC network upstream of the sub-node.

2. The method of claim 1, wherein the intelligent node uses the DOCSIS UCD control structure to determines the radio frequency (RF) characteristics of each burst transmission and wherein the intelligent node uses the RF characteristics of each burst transmission to modify the RF characteristics of an upstream transmission from a downstream device via signal processing.

3. The method of claim 1, wherein the scheduling information is obtained by the intelligent node by monitoring DOCSIS MAP control messages sent by the CMTS that identify the time when a particular cable modem is transmitting using the DOCSIS service identifier (SID).

4. The method of claim 2, wherein the RF characteristics of the burst transmissions are obtained by the intelligent node by monitoring the DOCSIS upstream channel descriptor (UCD) which includes the channel center frequency, channel width, and other parameters associated with different interval usage codes (IUCs) such as the type of modulation, preamble information, interleaving information, and Reed-Solomon (RS) Forward Error Correction (FEC) codes.

5. The method of claim 1 wherein DOCSIS service identifiers (SIDs) are assigned to a plurality of CMs belonging to a subnode such that the value of a SID uniquely identifies the CM as belonging to a given subnode.

6. The method of claim 1, further comprising identification of an intelligent node network topology by tagging of upstream packets by an intelligent node with a unique identifier such that the CMTS is enabled to associate a CM device with a particular subnode.

7. The method of claim 1, further comprising controlling at the intelligent node an amount of amplification provided to communications from a CM to a CMTS based upon a cable modem identifier.

8. The method of claim 1, further comprising scheduling by the CMTS such that only devices on a given sub-node network transmit in a given time slot, such that other DINs in the HFC network are enabled to keep their corresponding devices isolated.

9. The method of claim 1, further comprising the intelligent node filtering noise on channels other than the transmitting channel to remove interference with the upstream transmissions by CMs associated with other subnodes in the cable modem network.

10. The method of claim 1, further comprising filtering of noise on the transmitting channel by demodulating and decoding a signal received from the CM, and then re-encoding and re-modulating the signal before it is sent upstream.

11. The method of claim 1, further comprising calculating pre-equalization coefficients at the intelligent node for usage by at least one CM attached to a sub-node of the intelligent node in accordance with the DOCSIS pre-equalization specification.

12. The method of claim 4, further comprising modifying a channel carrier frequency of at least one CM at the intelligent node.

13. The method of claim 12, further comprising modifying a channel carrier frequency at an intelligent node from a first portion of spectrum above 15 MHz to a second portion of spectrum below 15 MHz to avoid the introduction of coupled household noise by at least one CM downstream of the DIN and make the second portion of spectrum usable for communications from the DIN to the CMTS.

14. The method of claim 12, further comprising modifying a channel carrier frequency at an intelligent node from a frequency which lies within the frequency range supported by a CM to a frequency range which lies outside the CM supported range so as to expand the available spectrum for upstream transmission.

15. The method of claim 1, further comprising independent configuration of channel carrier frequencies, channel widths, and other channel parameters on the CM and CMTS sides of the intelligent node.

16. The method of claim 15 further comprising independently scheduling the upstream channel transmissions for the CM-side and CMTS-side of the intelligent node.

17. The method of claim 16 wherein the scheduling entity for the CM side of the DIN resides within the intelligent node.

18. The method of claim 16 wherein the scheduling entity for the CM side of the DIN resides within the CMTS.

19. The method of claim 15, further comprising configuring non-bonded channels on a sub-node of the intelligent node and bonded channels upstream of the intelligent node to convert non-bonded traffic to bonded traffic.

20. The method of claim 15, further comprising configuring multiple narrower channels on a sub-node of the intelligent node to be combined to form a wider channel on the upstream interface of the intelligent node.

21. The method of claim 15, further comprising configuring multiple channels with a lower QAM modulation order to be combined to form fewer channels with a higher QAM modulation order on the upstream interface of the intelligent node.

22. The method of claim 1, further comprising gathering statistics on a downstream sub-node of the intelligent node, and communicating these statistics to the CMTS in order to provide fault isolation.

23. The method of claim 1, wherein the intelligent node is integrated into a fiber node.

24. The method of claim 1, wherein the intelligent node is integrated with at least one of a radio frequency (RF) line amplifier or a distribution amplifier.

25. The method of claim 1, wherein the intelligent node is integrated with a radio frequency over glass (RFoG) optical network unit (ONU).

* * * * *